(12) United States Patent
Cariou et al.

(10) Patent No.: US 11,206,683 B2
(45) Date of Patent: Dec. 21, 2021

(54) GEOLOCATION DATABASE DEPENDENT (GDD) OPERATIONS FOR 6GHZ

(71) Applicant: Intel Corporation, Santa Clara, CA (US)

(72) Inventors: Laurent Cariou, Portland, OR (US); Thomas J. Kenney, Portland, OR (US); Shahrnaz Azizi, Cupertino, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/627,941

(22) PCT Filed: Dec. 20, 2017

(86) PCT No.: PCT/US2017/067604
§ 371 (c)(1),
(2) Date: Dec. 31, 2019

(87) PCT Pub. No.: WO2019/027492
PCT Pub. Date: Feb. 7, 2019

(65) Prior Publication Data
US 2021/0168856 A1    Jun. 3, 2021

Related U.S. Application Data

(60) Provisional application No. 62/539,619, filed on Aug. 1, 2017.

(51) Int. Cl.
*H04W 74/00* (2009.01)
*H04W 16/14* (2009.01)
*H04W 84/12* (2009.01)
*H04W 88/06* (2009.01)

(52) U.S. Cl.
CPC ......... *H04W 74/006* (2013.01); *H04W 16/14* (2013.01); *H04W 74/004* (2013.01); *H04W 84/12* (2013.01); *H04W 88/06* (2013.01)

(58) Field of Classification Search
CPC . H04W 74/006; H04W 88/06; H04W 74/004; H04W 16/14; H04W 84/12
See application file for complete search history.

(56) References Cited

U.S. PATENT DOCUMENTS

| 8,213,874 B2 | 7/2012 | Agnew |
| 2010/0172296 A1 | 7/2010 | Singh et al. |
| 2014/0079043 A1* | 3/2014 | Montemurro ......... H04W 36/24 370/338 |

(Continued)

OTHER PUBLICATIONS

"International Application Serial No. PCT/US2017/067604, International Search Report dated Nov. 12, 2018", 3 pgs.

(Continued)

*Primary Examiner* — Mohammad S Anwar
(74) *Attorney, Agent, or Firm* — Schwegman Lundberg & Woessner, P.A.

(57) ABSTRACT

Methods, apparatus, and computer-readable media are described to decode a geolocation database dependent (GDD) enabling signal sent on a lower band. A 6 GHz band element is decoded. The 6 GHz band element includes a list of 6 GHz channel numbers. Data is encoded for transmission at 6 GHz on a 6 GHz channel associated with a 6 GHz channel number.

23 Claims, 7 Drawing Sheets

(56) References Cited

U.S. PATENT DOCUMENTS

2016/0234850 A1    8/2016  Freda et al.
2017/0290075 A1*  10/2017  Carbajal ............. H04W 64/006

OTHER PUBLICATIONS

"International Application Serial No. PCT/US2017/067604, Written Opinion dated Nov. 12, 2018", 7 pgs.

Adrian, Stephens, et al., "802.11 P802.11af (TVWS) Mandatory Draft Review (MDR)", IEEE 802.11-13/0451r2, IEEE P802.11 Wireless LANs, (May 21, 2013), 10-24.

Adriana, B Flores, et al., "IEEE 802.11af: A Standard for TV White Space Spectrum Sharing", In: IEEE Communications Magazine (vol. 51, Issue: 10), (Oct. 8, 2013), 92-100.

"International Application Serial No. PCT/US2017/067604, International Preliminary Report on Patentability dated Feb. 13, 2020", 9 pgs.

\* cited by examiner

US 11,206,683 B2

GEOLOCATION DATABASE DEPENDENT (GDD) OPERATIONS FOR 6GHZ

PRIORITY CLAIM

This application is a U.S. National Stage Filing under 35 U.S.C. 371 from International Application No. PCT/US2017/067604, filed Dec. 20, 2017 and published in English as WO 2019/027492 on Feb. 7, 2019, which claims priority to U.S. Provisional Patent Application 62/539,619, filed on Aug. 1, 2017, entitled "GEOLOCATION DATABASE DEPENDENT (GDD) OPERATIONS FOR 6 GHZ" each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for geolocation database dependent (GDD) operations adapted for IEEE 802.11ax 6 GHz.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DESCRIPTION

Currently in 802.11af STAs operate in lower bands, 2.4/5 GHz. The unlicensed band between 6 GHz and 7 GHz may be open for STA operation. Currently, 802.11af has defined a protocol to allow an access point (AP) access to a database that allows the AP to determine how a STA should access one of the lower bands. The APs with access to the database may be called geolocation database dependent (GDD) enabling STAs. A STA seeking to access a lower band may be referred to as a GDD dependent STA. A STA seeking to access the band between 6 GHz and 7 GHz may utilize features of the 802.11af GDD protocol with enhancements to seek access to the 6 GHz band. In various embodiments, a GDD process is described that allows enablement for operation of a STA at 6 GHz via messaging in the lower 2.4 GHz and 5 GHz bands.

Figure 1:
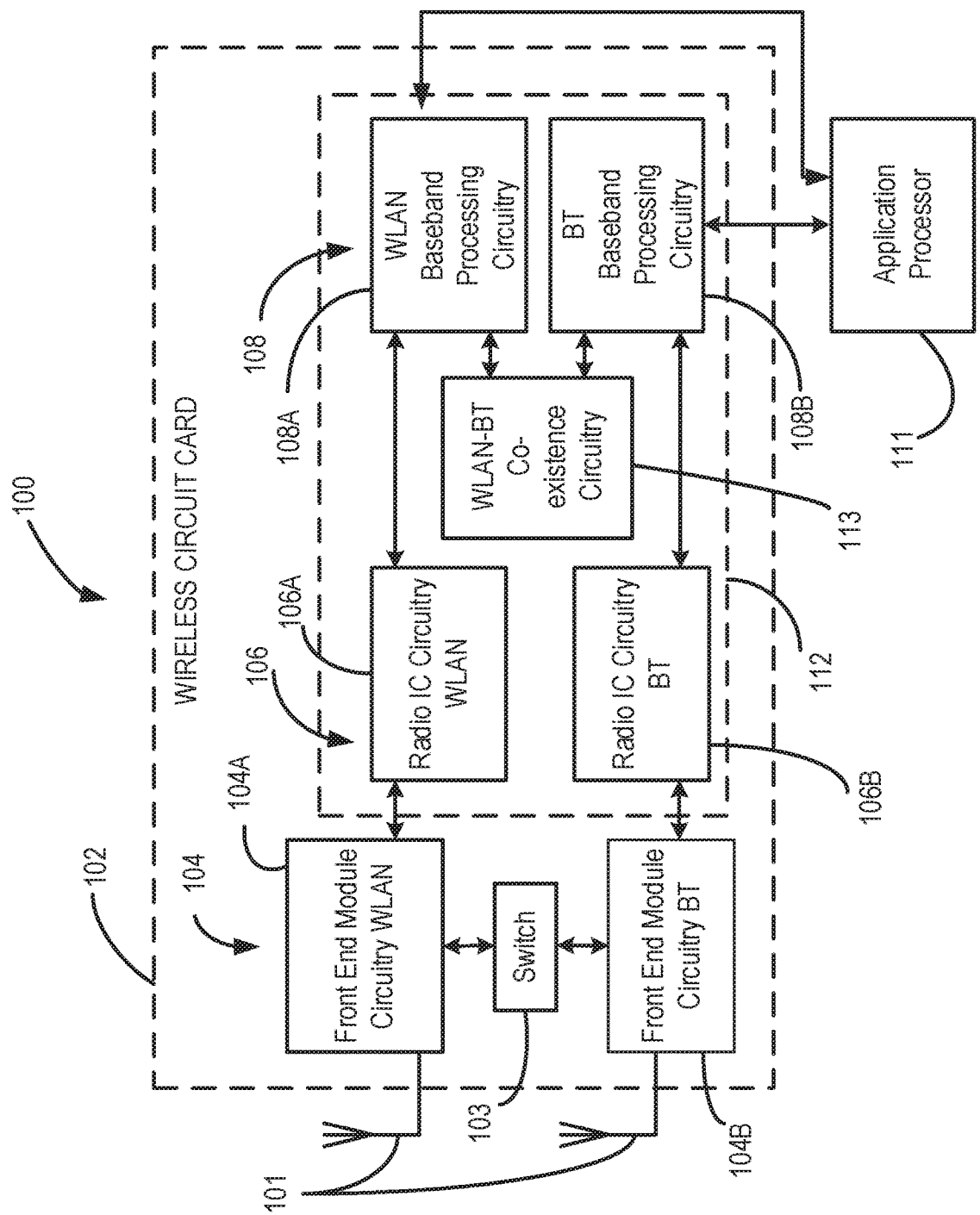
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received, signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 10413 to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
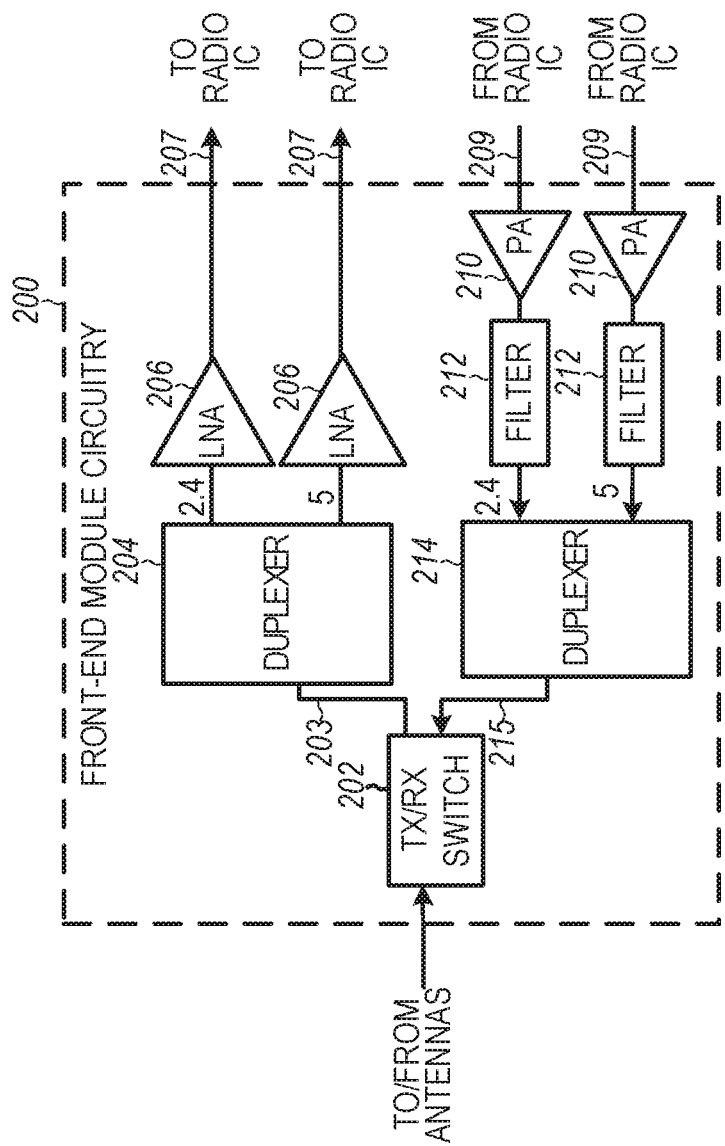
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
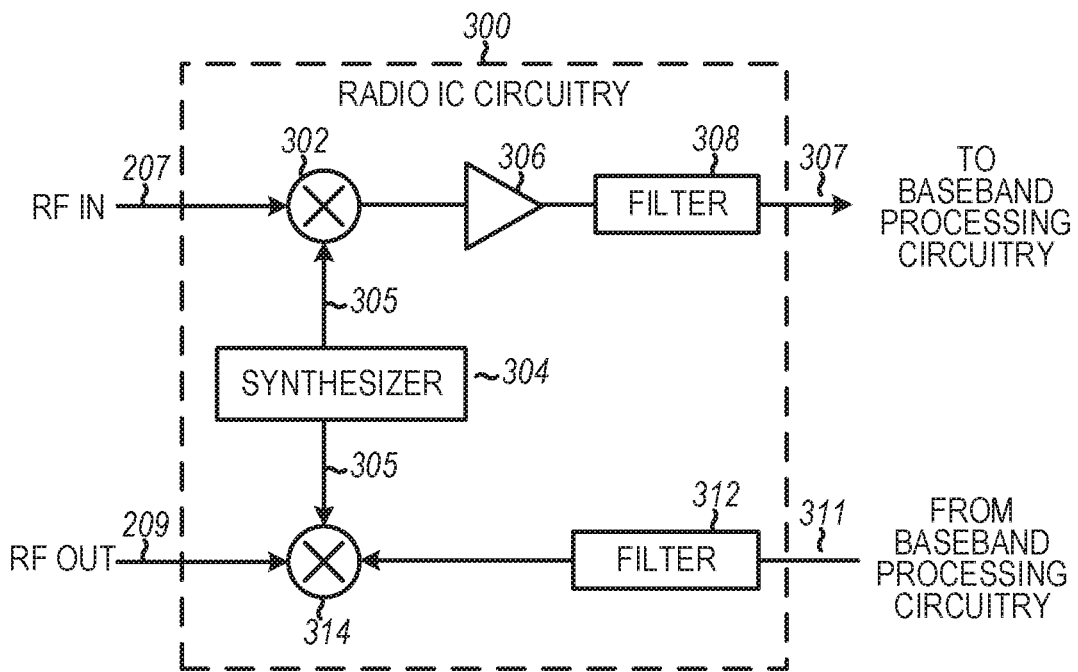
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor ill (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
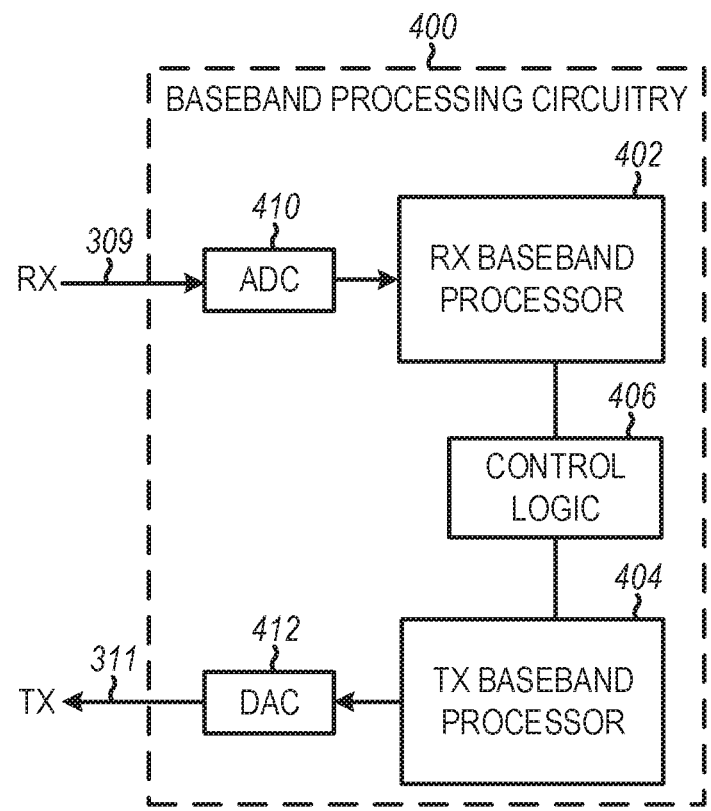
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
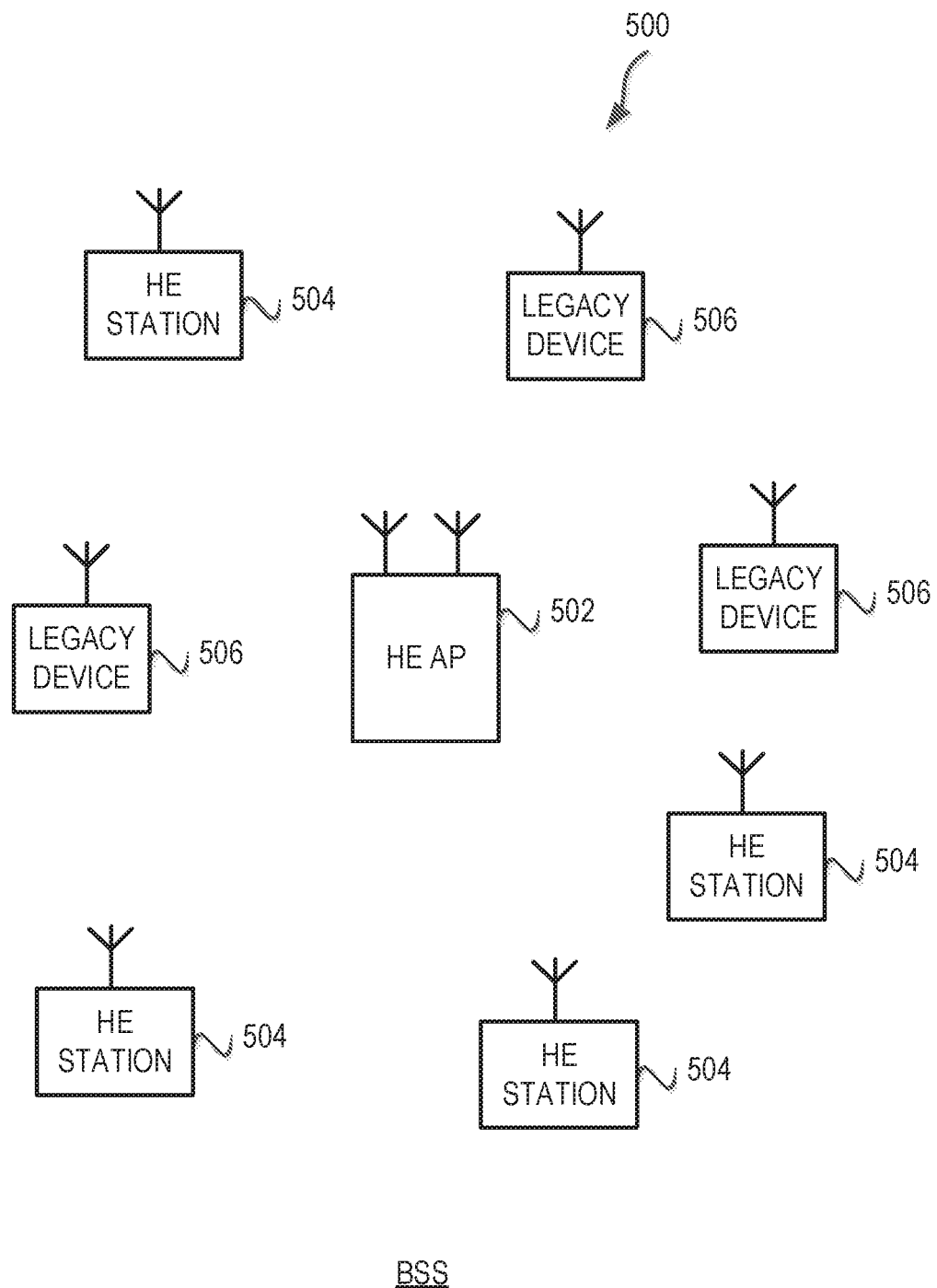
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), tune division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be stations (STAs) or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PDDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (ITT). An allocation of a bandwidth or a number of tones or subcarriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), interim Standard 2000 (IS-2000), interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-6.

In example embodiments, the HE station 504 and/or the HE AP 502 are configured to perform the methods and operations/functions described herein in conjunction with FIGS. 1-6. In example embodiments, an apparatus of the HE station 504 and/or an apparatus of the HE AP 502 are configured to perform the methods and functions described herein in conjunction with FIGS. 1-6. The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of an HE AP 502 may be referred to as HE AP STA. In some embodiments, a HE STA 504 may be referred to as a HE non-AP STA. In some embodiments, a HE STA 504 may be referred to as either a HE AP STA and/or HE non-AP.

Figure 6:
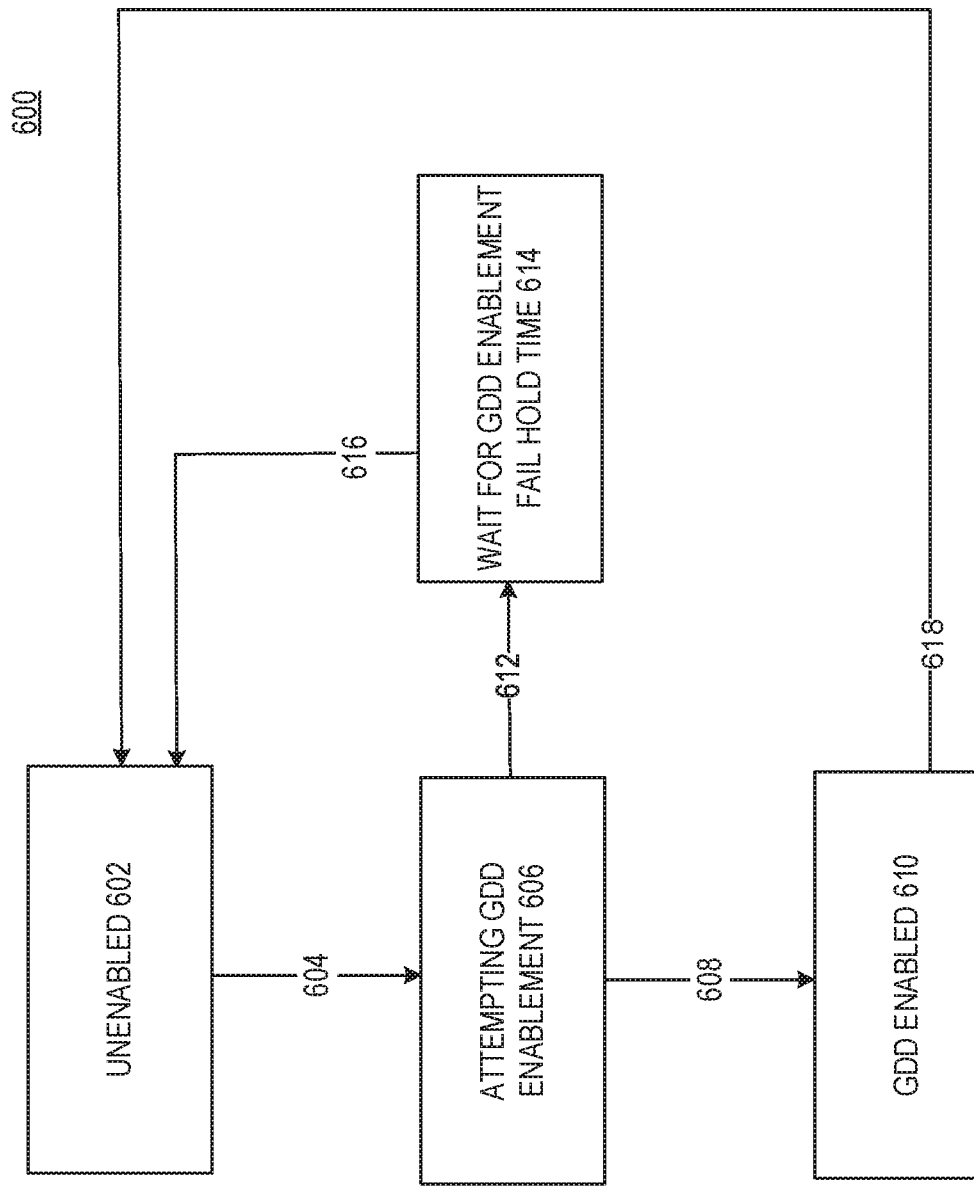
FIG. 6 illustrates an example of a 3-stage approach for a GDD-dependent station (STA) to be granted access to the television white spaces (TVWS) spectrum, in accordance with some embodiments.

FIG. 6 illustrates an example of a 3-stage approach for a GDD-dependent station (STA) to be granted access to the television white spaces (TVWS) spectrum, in accordance with some embodiments. In some embodiments, GDD dependent STAs follow a 3-stage approach before being granted access to some channels by GDD enabling STAs. In a first unenabled state 602, a STA is not allowed to transmit any energy on any of the TVWS channels. If the GDD dependent STA receives an enabling signal from a GDD enabling STA, the GDD dependent STA may transmit a GDD enablement request frame to the GDD enabling STA. After transmission of the GDD enablement request frame, the GDD dependent STA may transition 604 to an attempting GDD enablement state 606. If the GDD enablement response frame is successful, the GDD enabling STA may transmit a GDD enablement response frame with a status code indicating the response was successful and transition 608 to a GDD enabled state 610. For example, the GDD enablement response frame may include a status code of zero to indicate a successful response. In the GDD enabled state 610, the GDD dependent STA may transmit on the enabled TVWS channels.

While the GDD dependent STA is in the GDD enabled state 610, the GDD dependent STA may receive a GDD enablement response frame with a status code that indicates the GDD authorization has been deenabled. For example, the status code may be 107. If the GDD authorization has been deenabled, the GDD dependent station may transition back 618 to the unenabled state 602. In addition, once the GDD dependent STA enters the GDD enabled state 610, a timer is started. The timer indicates how long a GDD enablement is valid. Once this timer expires, the GDD dependent STA transitions back 618 to the unenabled state 602. The timer expiration value may be the dot11GDDEnablementValidityTimer.

While a GDD dependent STA is attempting GDD enablement 606, the GDD dependent STA may receive a GDD enablement response frame with a status code that indicates a failure or a denial of access. For example, the status code may be 105, 106, 38, or indicate that there has been a failed enablement attempt within the GDD enablement time limit, e.g., a dot11GDDEnablementTimeLimit value. When this occurs, the GDD dependent STA may enter a wait state 614. In the wait state 614, the GDD dependent STA waits a specific amount of time before moving back to the unenabled state 602. In the unenabled state 602, the GDD dependent STA may restart the GDD enablement process. In an example, the amount of time the GDD dependent STA waits in the wait state 614 is the dot11GDDEnablementFailHoldTime value.

In some embodiments, a GDD dependent station wanting to operate at 6 GHz will follow a similar TVWS approach. In an example, access to 6 GHz will be based on the same database used by the GDD enabling STA to grant STAs access to the lower bands.

In an example, an AP, e.g., a GDD enabling STA, operates in multiple bands. For example, the AP may operate in the lower bands (2.5/5 GHz) and in higher bands (6 GHz). Accordingly, a GDD enablement process for 6 GHz may take advantage by modifying the GDD enablement process for the lower bands. For example, a GDD dependent STA may also operate in the multiple bands and request GDD enablement at 6 GHz through a first association at 2.4/5 GHz or through a first transmission of discovery information in the lower band. Thus the GDD enablement procedure may be more efficient by taking into account the multi-band procedure and enable to one band via interactions at another band or bands. In some embodiments, the IEEE 802.11af GDD enablement procedure may happen in-band, meaning at 6 GHz.

In an embodiment, the GDD enabling signal may have extended capabilities beyond acting as a beacon transmitted in band with an extended capability element with a geodatabase in-band enabling signal field with a value 1. For example, the GDD enabling signal may include a neighbor report element transmitted in any other band or in the same band but in another channel, that indicates the channel number index of the channel that becomes enabled. If the channel index corresponds to a 20 MHz channel, the enablement is for the 20 MHz channel, if the channel index corresponds to an 80 MHz channel, the enablement is for the entire 80 MHz channel. As another example, the GDD enabling signal may include a reduced neighbor report element transmitted in any other band or in the same band but in another channel, which includes a neighbor AP information field for each channel on which there is an operating AP and for which the enablement applies.

In an example, the GDD enablement request and response frames may be in a band different from the desired band. For example, the GDD enablement request and response frames may be sent in the 2.4 GHz band or the 5 GHz band, to enable the GDD dependent STA to reach the GDDenabled STAs for any channels in the 6 GHz band, before moving to 6 GHz. The GDD enablement response frame may include a 6 GHz band element, e.g., a 6GMAP, which is similar to the white space map (WSM) and contains the list of channel numbers at 6 GHz that are enabled. In addition, the 6GMAP may include, for each channel, the max transmit power constraint that needs to be respected by the GDD dependent STA. This exchange should be able to be done in associated mode, or in non-associated mode in the lower bands. The STA may be identified in the different bands by sharing the MAC addresses in all bands, or by using the Device Identification information (e.g., FCC ID per device for the United States), which is included in the GDD enablement request frame.

In another example, the a GDD enabling STA may directly enable a GDD dependent STA by providing the 6GMAP element in the beacon transmitted by the related GDD enabling STA at 2.4 and 5 GHz. The GDD enabling STA may also send a probe response, an association response, in BSS transition management messages information regarding channels available for a STA in the 6 GHz band. This way the GDD dependent STA may receive the channels at 6 GHz that are available for the STA's use. In this example, the GDD dependent STA does not need to make a frame exchange with the GDD enabling STA in the lower band. If the GDD enabling STA wants to control the access and ensure that, when the GDD dependent STA then intends to associate in the 6 GHz band, the GDD dependent STA was enabled in the lower band, the GDD enabling STA may include the WSM only in unicasted probe responses or association responses. In addition, the GDD enabling STA may include the WSM in a secure transaction with a STA associated with the GDD enabling STA at 2.4 and 5 GHz. The GDD enabling STA may include such information at 2.4 GHz and 5 GHz only to STAB that are included in the probe request or association request. For example, the STA has provided the information to the GDD enabling STA that they support operation in the operating class corresponding to the 6 GHz band.

In an example, a AP may know the MAC address of the STA on the 6 GHz band and on the lower band. This information may be provided either in a probe request, an association, or an authentication request in the lower band.

In an example, an AP may operate in a lower band and a higher band. In another example, an AP that operates at 2.4 GHz is collocated with an AP that operates at 5 GHz: and an AP that operates at 6 GHz. A STA may be capable of operating in one of the lower bands, e.g., 2.4 GHz or 5 GHz, and also at 6 GHz. In this example, the STA may send an association request to the 5 GHz AP (e.g, indicating that the STA supports operation at 6 GHz and providing the STA's MAC address at 6 GHz). In response, the 5 GHz AP may send an association response that denies access but which includes additional information. For example, the association response may include a neighbor report with recommended APs to connect to, some of them being at 6 GHz. The neighbor report may include an indication as to which APs support 6 GHz operation. The STA may then request enablement at 6 GHz by starting the GDD enablement process with one of the neighboring APs from the neighbor report. In an example, the STA may prioritize the APs to access depending on whether the AP supports 6 GHz. The association response may include a 6GMAP with all the channels that are allowed at 6 GHz and the transmit power restrictions on each AP.

Based on the reception of the response frame by the STA, the STA is enabled to operation at 6 GHz in all channels identified in the 6GMAP. The STA may transmit (e.g., respecting the max transmit power constraints) and associate to an AP at 6 GHz. The AP at 6 GHz may know the MAC address of the STA via the STA's messaging. The AP may accept the STA's association.

In some embodiments, an AP may send a GDD enablement response frame to the STA to de-enable the access to that band or to different channels. This frame may be associated with a BSS transition management (BTM) request that proposes a BSS transition to another AP in another channel at 6 GHz or to another AP in another band (e.g. 2.4 or 5 GHz).

In another example, a STA may be associated at 2.4 GHz to an AP. The STA may declare during the association that the STA is 6 GHz capable and provide its MAC address at 6 GHz. The AP may decide to trigger a BSS transition for that STA and send a BTM request to that STA with a neighbor report indicating the BSS identifier (BSSID) of the AP at 6 GHz, its channel index at 6 GHz and the power constraint to respect. The AP may also send the GDD enablement response frame to the STA to directly enable the STA in the 6 GHz channel. The STA may then send a re-association frame in the 6 GHz enabled channel to the corresponding AP and get access to the 6 GHz band.

Figure 7:
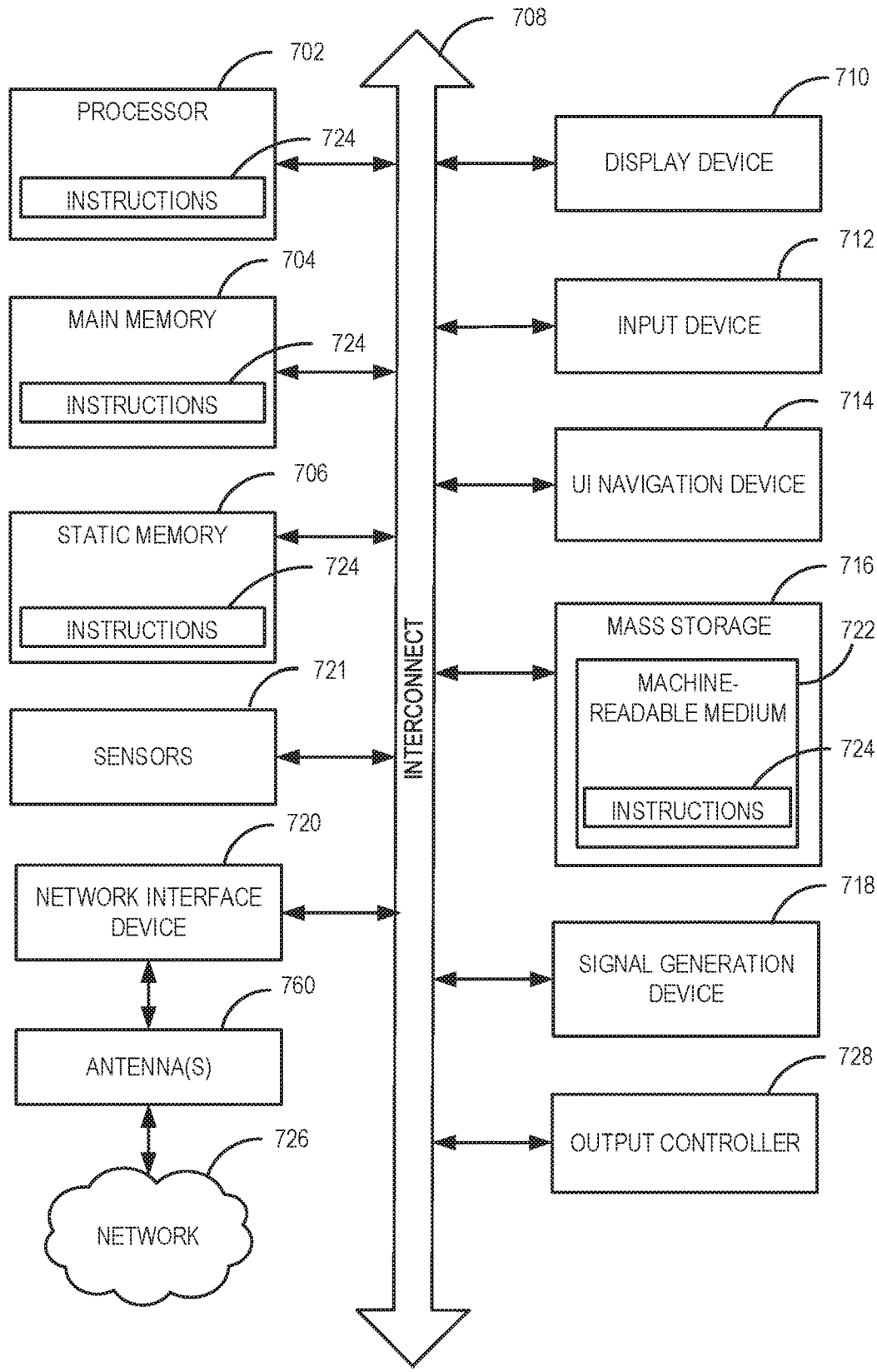
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708.

Specific examples of main memory 704 include Random Access Memory (RAM), and semiconductor memory devices, which may include, in some embodiments, storage locations in semiconductors such as registers. Specific examples of static memory 706 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 700 may further include a display device 710, an input device 712 (e.g., a keyboard), and a user interface (UI) navigation device 714 (e.g., a mouse). In an example, the display device 710, input device 712 and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc). In some embodiments the processor 702 and/or instructions 724 may comprise processing circuitry and/or transceiver circuitry.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 722 is illustrated as a single medium, the term "machine readable medium" may include a single medium or multiple media (e.g., a centralized or distributed database, and/or associated caches and servers) configured to store the one or more instructions 724.

An apparatus of the machine 700 may be one or more of a hardware processor 702 (e.g., a central processing unit (CPU), a graphics processing unit (GPU), a hardware processor core, or any combination thereof), a main memory 704 and a static memory 706, sensors 721, network interface device 720, antennas 760, a display device 710, an input device 712, a UI navigation device 714, a mass storage 716, instructions 724, a signal generation device 718, and an output controller 728. The apparatus may be configured to perform one or more of the methods and/or operations disclosed herein. The apparatus may be intended as a component of the machine 700 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 720 may include one or more physical jacks (e.g., Ethernet, coaxial, or phone jacks) or one or more antennas to connect to the communications network 726. In an example, the network interface device 720 may include one or more antennas 760 to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 8:
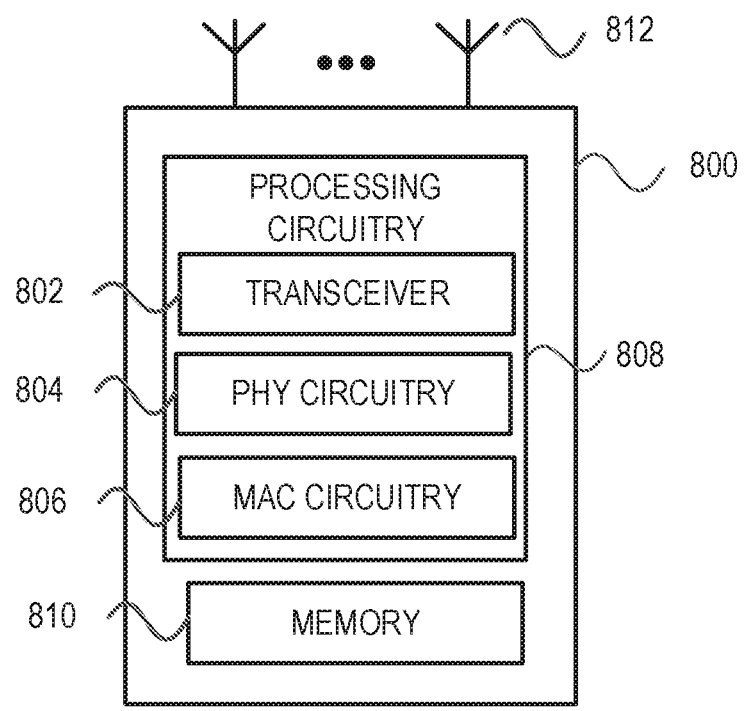
FIG. 8 illustrates a block diagram of an example wireless device upon which any one or more of the techniques (e.g., methodologies or operations) discussed herein may perform.

FIG. 8 illustrates a block diagram of an example wireless device 800 upon which any one or more of the techniques (e.g., methodologies or operations) discussed herein may perform. The wireless device 800 may be a HE device. The wireless device 800 may be a HE STA 504 and/or HE AP 502 (e.g., FIG. 5). A HE STA 504 and/or HE AP 502 may include some or all of the components shown in FIGS. 1-5, 7, and 8. The wireless device 800 may be an example machine 700 as disclosed in conjunction with FIG. 7.

The wireless device 800 may include processing circuitry 808. The processing circuitry 808 may include a transceiver 802, physical layer circuitry (PHY circuitry) 804, and MAC layer circuitry (MAC circuitry) 806, one or more of which may enable transmission and reception of signals to and from other wireless devices 800 (e.g., HE AP 502, HE STA 504, and/or legacy devices 506) using one or more antennas 812. As an example, the PHY circuitry 804 may perform various encoding and decoding functions that may include formation of baseband signals for transmission and decoding of received signals. As another example, the transceiver 802 may perform various transmission and reception functions such as conversion of signals between a baseband range and a Radio Frequency (RF) range.

Accordingly, the PHY circuitry 804 and the transceiver 802 may be separate components or may be part of a combined component, e.g., processing circuitry 808. In addition, some of the described functionality related to transmission and reception of signals may be performed by a combination that may include one, any or all of the PHY circuitry 804 the transceiver 802, MAC circuitry 806, memory 810, and other components or layers. The MAC circuitry 806 may control access to the wireless medium. The wireless device 800 may also include memory 810 arranged to perform the operations described herein, e.g., some of the operations described herein may be performed by instructions stored in the memory 810.

The antennas 812 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 812 may be effectively separated to take advantage of spatial diversity and the different channel characteristics that may result.

One or more of the memory 810, the transceiver 802, the PHY circuitry 804, the MAC circuitry 806, the antennas 812, and/or the processing circuitry 808 may be coupled with one another. Moreover, although memory 810, the transceiver 802, the PHY circuitry 804, the MAC circuitry 806, the antennas 812 are illustrated as separate components, one or more of memory 810, the transceiver 802, the PRY circuitry 804, the MAC circuitry 806, the antennas 812 may be integrated in an electronic package or chip.

In some embodiments, the wireless device 800 may be a mobile device as described in conjunction with FIG. 7. In some embodiments, the wireless device 800 may be configured to operate in accordance with one or more wireless communication standards as described herein (e.g., as described in conjunction with FIGS. 1-5 and 7, IEEE 802.11). In some embodiments, the wireless device 800 may include one or more of the components as described in conjunction with FIG. 7 (e.g., display device 710, input device 712, etc.) Although the wireless device 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 800 may include various components of the wireless device 800 as shown in FIG. 8 and/or components from FIGS. 1-5 and 7. Accordingly, techniques and operations described herein that refer to the wireless device 800 may be applicable to an apparatus for a wireless device 800 (e.g., HE AP 502 and/or HE STA 504), in some embodiments. In some embodiments, the wireless device 800 is configured to decode and/or encode signals, packets, and/or frames as described herein, e.g., PPDUs.

In some embodiments, the MAC circuitry 806 may be arranged to contend for a wireless medium during a contention period to receive control of the medium for a HE TXOP and encode or decode a HE PPM. In some embodiments, the MAC circuitry 806 may be arranged to contend for the wireless medium based on channel contention settings, a transmitting power level, and a clear channel assessment level (e.g., an energy detect level).

The PHY circuitry 804 may be arranged to transmit signals in accordance with one or more communication standards described herein. For example, the PHY circuitry 804 may be configured to transmit a HE PPDU. The PHY circuitry 804 may include circuitry for modulation/demodulation, upconversion/downconversion, filtering, amplification, etc. In some embodiments, the processing circuitry 808 may include one or more processors. The processing circuitry 808 may be configured to perform functions based on instructions being stored in a RAM or ROM, or based on special purpose circuitry. The processing circuitry 808 may include a processor such as a general-purpose processor or special purpose processor. The processing circuitry 808 may implement one or more functions associated with antennas 812, the transceiver 802, the PHY circuitry 804, the MAC circuitry 806, and/or the memory 810. In some embodiments, the processing circuitry 808 may be configured to perform one or more of the functions/operations and/or methods described herein.

In mmWave technology, communication between a station (e.g., the HE stations 504 of FIG. 5 or wireless device 800) and an access point (e.g., the HE AP 502 of FIG. 5 or wireless device 800) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Additional Notes and Examples

Example 1 is an apparatus of a station (STA) configurable for multi-band operation including six gigahertz (GHz) band operation, the apparatus comprising: memory; and processing circuitry, the processing circuitry configured to: decode a geolocation database dependent (GDD) enabling signal sent on a lower band; decode a six GMAP element, wherein the six GMAP element comprises a list of six GHz channel numbers, wherein the list of six GHz channel numbers comprises the six GHz channel number; and encode data for transmission at six GHz on a six GHz channel associated with the six GHz channel number.

In Example 2, the subject matter of Example 1 includes, wherein the memory is configured to store the six GHz channel number.

In Example 3, the subject matter of Examples 1-2 includes, wherein the lower band comprises a two point four GHz band.

In Example 4, the subject matter of Examples 1-3 includes, wherein the lower band comprises a five GHz band.

In Example 5, the subject matter of Examples 1-4 includes, wherein the GDD enabling signal comprises the six GMAP element.

In Example 6, the subject matter of Examples 1-5 includes, wherein the processing circuitry is further configured to encode, in response to the GDD enabling signal, a GDD enablement request frame for transmission on the lower band.

In Example 7, the subject matter of Example 6 includes, wherein the processing circuitry is further configured to decode a GDD enablement response frame in response to the GDD enablement request frame.

In Example 8, the subject matter of Example 7 includes, wherein the GDD enablement response frame comprises the six GMAP element.

In Example 9, the subject matter of Examples 6-8 includes, wherein the GDD enablement request frame comprises a MAC address of the station for use on the six GHz channel.

In Example 10, the subject matter of Examples 1-9 includes, wherein the GDD enabling signal comprises a neighbor report element.

In Example 11, the subject matter of Examples 1-10 includes, wherein the processing circuitry is further configured to: decode a basic service set (BSS) transition management (BTM) request on the six GHz channel, the BTM request comprising a neighbor report that includes a BSS identifier of a six GHz access point and a handoff six GHz channel index for the six GHz access point; and encode a reassociation frame in response to the BTM for the six GHz access point on a channel based on the handoff six GHz channel index.

Example 12 is a method performed by processing circuitry of station (STA) configured for a six GHz operation, the method comprising: decoding a geolocation database dependent (GDD) enabling signal sent on a lower band; decoding a six GMAP element, wherein the six GMAP element comprises a list of six GHz channel numbers, wherein the list of six GHz channel numbers comprises the six GHz channel number; and encoding data for transmission at six GHz on a six GHz channel associated with the six GHz channel number.

In Example 13, the subject matter of Example 12 includes, GHz band.

In Example 14, the subject matter of Examples 12-13 includes, wherein the lower band comprises a five GHz band.

In Example 15, the subject matter of Examples 12-14 includes, wherein the GDD enabling signal comprises the six GMAP element.

In Example 16, the subject matter of Examples 12-15 includes, encoding a GDD enablement request frame for transmission on the lower band.

In Example 17, the subject matter of Example 16 includes, decoding a GDD enablement response frame in response to the GDD enablement request frame.

In Example 18, the subject matter of Example 17 includes, wherein the GDD enablement response frame comprises the six GMAP element.

In Example 19, the subject matter of Examples 16-18 includes, wherein the GDD enablement request frame comprises a MAC address of the station for use on the six GHz channel.

In Example 20, the subject matter of Examples 12-19 includes, wherein the GDD enabling signal comprises a neighbor report element.

In Example 21, the subject matter of Examples 12-20 includes, decoding a basic service set (BSS) transition management (BTM) request on the six GHz channel, the BTM request comprising a neighbor report that includes a BSS identifier of a six GHz access point and a handoff six GHz channel index for the six GHz access point; and encoding a reassociation frame in response to the BTM for the six GHz access point on a channel based on the handoff six GHz channel index.

Example 22 is at least one computer-readable medium comprising instructions Which when executed by processing circuitry of a station (STA) to configure the SA for six GHz operation, to cause the STA to perform operations: decoding a geolocation database dependent (GDD) enabling signal sent on a lower band; decoding a six GMAP element, wherein the six GMAP element comprises a list of six GHz channel numbers, wherein the list of six GHz channel numbers comprises the six GHz channel number; and encoding data for transmission at six GHz on a six GHz channel associated with the six GHz channel number.

In Example 23, the subject matter of Example 22 includes, wherein the lower band comprises a two point four GHz band.

In Example 24, the subject matter of Examples 22-23 includes, wherein the lower band comprises a five GHz band.

In Example 25, the subject matter of Examples 22-24 includes, wherein the GDD enabling signal comprises the six GMAP element.

In Example 26, the subject matter of Examples 22-25 includes, wherein the operations further comprise encoding a GDD enablement request frame for transmission on the lower band.

In Example 27, the subject matter of Example 26 includes, wherein the operations further comprise decoding a GDD enablement response frame in response to the GDD enablement request frame.

In Example 28, the subject matter of Example 27 includes, wherein the GDD enablement response frame comprises the six GMAP element.

In Example 29, the subject matter of Examples 26-28 includes, wherein the GDD enablement request frame comprises a MAC address of the station for use on the six GHz channel.

In Example 30, the subject matter of Examples 22-29 includes, wherein the GDD enabling signal comprises a neighbor report element.

In Example 31, the subject matter of Examples 12-30 includes, wherein the operations further comprise: decoding a basic service set (BSS) transition management (BTM) request on the six GHz channel, the BTM request comprising a neighbor report that includes a BSS identifier of a six GHz access point and a handoff six GHz channel index for the six GHz access point; and encoding a reassociation frame in response to the BTM for the six GHz access point on a channel based on the handoff six GHz channel index.

Example 32 is at least one machine-readable medium including instructions, which when executed by a machine, cause the machine to perform operations of any of the operations of Examples 12-21.

Example 33 is an apparatus comprising means for performing any of the operations of Examples 12-21.

Example 34 is an apparatus for a six gigahertz (GHz) access point, the apparatus comprising: memory configured to store a list of six GHz channel numbers; processing circuitry configured to: encode a geolocation database dependent (GDD) enabling signal for transmission on a lower band; encode a six GMAP element, wherein the six GMAP element comprises the list of six GHz channel numbers; decode, in response to the GDD enabling signal, a GDD enablement request frame from a station on the lower band; and decode data, from the station, on a six GHz channel from the list of six GHz channel numbers.

In Example 35, the subject matter of Example 34 includes, wherein the lower band comprises a two point four GHz band.

In Example 36, the subject matter of Examples 34-35 includes, wherein the lower band comprises a five GHz band.

In Example 37, the subject matter of Examples 34-36 includes, wherein the GDD enabling signal comprises the six GMAP element.

In Example 38, the subject matter of Examples 34-37 includes, wherein the processing circuitry is further configured to encode a GDD enablement response frame in response to the GDD enablement request frame.

In Example 39, the subject matter of Example 38 includes, wherein the GDD enablement response frame comprises the six GMAP element.

In Example 40, the subject matter of Examples 34-39 includes, wherein the GDD enablement request frame comprises a MAC address of the station for use on the six GHz channel.

In Example 41, the subject matter of Examples 34-40 includes, wherein the GDD enabling signal comprises a neighbor report element.

In Example 42, the subject matter of Examples 34-41 includes, wherein the processing circuitry is further configured to: encode a basic service set (BSS) transition management (BTM) request on the six GHz channel, the BTM request comprising a neighbor report that includes a BSS identifier of a six GHz handoff access point and a handoff six GHz channel index for the six GHz handoff access point.

Example 43 is a method for a six gigahertz (GHz) access point, the method comprising: encoding a geolocation database dependent (GDD) enabling signal for transmission on a lower band; encoding a six GMAP element, wherein the six GMAP element comprises the list of six GHz channel numbers; decoding, in response to the GDD enabling signal, a GDD enablement request frame from a station on the lower band; and decode data, from the station, on a six GHz channel from the list of six GHz channel numbers.

In Example 44, the subject matter of Example 43 includes, wherein the lower band comprises a two point four GHz band.

In Example 45, the subject matter of Examples 43-44 includes, wherein the lower band comprises a five GHz band.

In Example 46, the subject matter of Examples 43-45 includes, wherein the GDD enabling signal comprises the six GMAP element.

In Example 47, the subject matter of Examples 43-46 includes, encoding a GDD enablement response frame in response to the GDD enablement request frame.

In Example 48, the subject matter of Example 47 includes, wherein the GDD enablement response frame comprises the six GMAP element.

In Example 49, the subject matter of Examples 43-48 includes, wherein the GDD enablement request frame comprises a MAC address of the station for use on the six GHz channel.

In Example 50, the subject matter of Examples 43-49 includes, wherein the GDD enabling signal comprises a neighbor report element.

In Example 51, the subject matter of Examples 43-50 includes, encoding a basic service set (BSS) transition management (BTM) request on the six GHz channel, the BTM request comprising a neighbor report that includes a BSS identifier of a six GHz handoff access point and a handoff six GHz channel index for the six GHz handoff access point.

Example 52 is at least one computer-readable medium for a six GHz access point (AP) comprising instructions which when executed by the six GHz AP, cause the six GHz AP to perform operations comprising: encoding a geolocation database dependent (GDD) enabling signal for transmission on a lower band; encoding a six GMAP element, wherein the six GMAP element comprises the list of six GHz channel numbers; decoding, in response to the GDD enabling signal, a GDD enablement request frame from a station on the lower band; and decode data, from the station, on a six GHz channel from the list of six GHz channel numbers.

In Example 53, the subject matter of Examples 2-52 includes, wherein the lower band comprises two point four GHz band.

In Example 54, the subject matter of Examples 2-53 includes, wherein the lower band comprises a five GHz band.

In Example 55, the subject matter of Examples 2-54 includes, wherein the GDD enabling signal comprises the six GMAP element.

In Example 56, the subject matter of Examples 2-55 includes, wherein the operations further comprise encoding a GDD enablement response frame in response to the GDD enablement request frame.

In Example 57, the subject matter of Examples 6-56 includes, wherein the GDD enablement response frame comprises the six GMAP element.

In Example 58, the subject matter of Examples 2-57 includes, wherein the GDD enablement request frame comprises a MAC address of the station for use on the six GHz channel.

In Example 59, the subject matter of Examples 2-58 includes, wherein the GDD enabling signal comprises a neighbor report element.

In Example 60, the subject matter of Examples 2-59 includes, wherein the operations further comprise encoding a basic service set (BSS) transition management (BTM) request on the six GHz channel, the BTM request comprising a neighbor report that includes a BSS identifier of a six GHz handoff access point and a handoff six GHz channel index for the six GHz handoff access point.

Example 61 is at least one machine-readable medium including instructions, which when executed by a machine, cause the machine to perform operations of any of the operations of Examples 43-five 1.

Example 62 is an apparatus comprising means for performing any of the operations of Examples 43-five 1.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a station (STA) configurable for multi-band operation including 6 gigahertz (GHz) band operation, the apparatus comprising:
   memory; and
   processing circuitry, the processing circuitry configured to:
   decode a geolocation database dependent (GDD) enabling signal sent on a lower band;

decode a 6 GHz band element, wherein the 6 GHz band element comprises a list of 6 GHz channel numbers, wherein the list of 6 GHz channel numbers comprises a 6 GHz channel number;

encode data for transmission at 6 GHz on a 6 GHz channel associated with the 6 GHz channel number, decode a basic service set (BSS) transition management (BTM) request on the 6 GHz channel, the BTM request comprising a neighbor report that includes a BSS identifier of a 6 GHz access point and a handoff 6 GHz channel index for the 6 GHz access point; and encode a reassociation frame in response to the BTM for the 6 GHz access point on a channel based on the handoff 6 GHz channel index.

2. The apparatus of claim 1, wherein the memory is configured to store the 6 GHz channel number.

3. The apparatus of claim 1, wherein the lower band comprises a 2.4 GHz band.

4. The apparatus of claim 1, wherein the lower band comprises a 5 GHz band.

5. The apparatus of claim 1, wherein the GDD enabling signal comprises the 6 GHz band element.

6. The apparatus of claim 1, wherein the processing circuitry is further configured to encode, in response to the GDD enabling signal, a GDD enablement request frame for transmission on the lower band.

7. The apparatus of claim 6, wherein the processing circuitry is further configured to decode a GDD enablement response frame in response to the GDD enablement request frame.

8. The apparatus of claim 7, wherein the GDD enablement response frame comprises the 6 GHz band element.

9. The apparatus of claim 6, wherein the GDD enablement request frame comprises a MAC address of the station for use on the 6 GHz channel.

10. The apparatus of claim 1, wherein the GDD enabling signal comprises the neighbor report element.

11. A method performed by processing circuitry of station (STA) configured for a six GHz operation, the method comprising:

decoding a geolocation database dependent (GDD) enabling signal sent on a lower band;

decoding a 6 GHz band element wherein the 6 GHz band element comprises a list of 6 GHz channel numbers, wherein the list of 6 GHz channel numbers comprises a 6 GHz channel number;

encoding data for transmission at 6 GHz on a 6 GHz channel associated with the 6 GHz channel number, decoding a basic service set (BSS) transition management (BTM) request on the 6 GHz channel, the BTM request comprising a neighbor report that includes a BSS identifier of a 6 GHz access point, and a handoff 6 GHz channel index for the 6 GHz access point; and encoding a reassociation frame in response to the BTM for the 6 GHz access point on a channel based on the handoff 6 GHz channel index.

12. The method of claim 11, wherein the lower band comprises a 2.4 GHz band.

13. The method of claim 11, wherein the lower band comprises a 5 GHz band.

14. The method of claim 11, wherein the GDD enabling signal comprises the 6 GHz band element.

15. The method of claim 11, further comprising encoding a GDD enablement request frame for transmission on the lower band.

16. The method of claim 15, further comprising decoding a GDD enablement response frame in response to the GDD enablement request frame.

17. The method of claim 16, wherein the GDD enablement response frame comprises the 6 GHz band element.

18. The method of claim 15, wherein the GDD enablement request frame comprises a MAC address of the station for use on the 6 GHz channel.

19. The method of claim 11, wherein the GDD enabling signal comprises the neighbor report element.

20. At least one non-transitory computer-readable storage medium comprising instructions which when executed by processing circuitry of a station (STA) to configure the SA for six GHz operation, to cause the STA to perform operations:

decoding a geolocation database dependent (GDD) enabling signal sent on a lower band;

decoding a 6 GHz band element wherein the 6 GHz band element comprises a list of 6 GHz channel numbers, wherein the list of 6 GHz channel numbers comprises a 6 GHz channel number;

encoding data for transmission at 6 GHz on a 6 GHz channel associated with the 6 GHz channel number, decoding a basic service set (BSS) transition management (BTM) request on the 6 GHz channel, the BTM request comprising a neighbor report that includes a BSS identifier of a 6 GHz access point and a handoff 6 GHz channel index for the 6 GHz access point; and encoding a reassociation frame in response to the BTM for the 6 GHz access point on a channel based on the handoff 6 GHz channel index.

21. The at least one non-transitory computer-readable storage medium of claim 20, wherein the lower band comprises a 2.4 GHz band.

22. The at least one non-transitory computer-readable storage medium of claim 20, wherein the lower band comprises a 5 GHz band.

23. The at least one non-transitory computer-readable storage medium of claim 20, wherein the GDD enabling signal comprises the 6 GHz band element.

* * * * *

UNITED STATES PATENT AND TRADEMARK OFFICE
CERTIFICATE OF CORRECTION

| | | |
|---|---|---|
| PATENT NO. | : 11,206,683 B2 | Page 1 of 1 |
| APPLICATION NO. | : 16/627941 | |
| DATED | : December 21, 2021 | |
| INVENTOR(S) | : Cariou et al. | |

It is certified that error appears in the above-identified patent and that said Letters Patent is hereby corrected as shown below:

In the Claims

In Column 25, Line 52, in Claim 11, delete "point," and insert --point-- therefor Signed and Sealed this
Eighth Day of March, 2022

Drew Hirshfeld
*Performing the Functions and Duties of the
Under Secretary of Commerce for Intellectual Property and
Director of the United States Patent and Trademark Office*